United States Patent [19]
Mehra et al.

[11] Patent Number: 6,028,589
[45] Date of Patent: *Feb. 22, 2000

[54] METHOD AND APPARATUS FOR VIDEO SCALING AND CONVOLUTION FOR DISPLAYING COMPUTER GRAPHICS ON A CONVENTIONAL TELEVISION MONITOR

[75] Inventors: Vivek Mehra, Sunnyvale; Edwin Rose, Mill valley, both of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,249

[22] Filed: Jan. 10, 1997

Related U.S. Application Data

[63] Continuation of application No. 08/543,102, Oct. 13, 1995.

[51] Int. Cl.[7] .............................. G09G 5/04; H04N 7/01
[52] U.S. Cl. ......................... 345/154; 348/441; 348/446
[58] Field of Search ........................... 345/3, 127, 128, 345/129, 130, 132, 136, 137, 138; 348/441–449, 154

[56] References Cited

U.S. PATENT DOCUMENTS

| | | | |
|---|---|---|---|
| 4,924,315 | 5/1990 | Yamashita | 358/160 |
| 5,005,011 | 4/1991 | Perlman et al. | 345/137 |
| 5,097,257 | 3/1992 | Clough et al. | 340/814 |
| 5,182,643 | 1/1993 | Futscher | 358/140 |
| 5,185,817 | 2/1993 | Degi et al. | 345/132 |
| 5,410,616 | 4/1995 | Kidd | 345/127 |

FOREIGN PATENT DOCUMENTS

| | | |
|---|---|---|
| 0639029 | 2/1995 | European Pat. Off. . |
| 0639923 | 2/1995 | European Pat. Off. . |
| 2274954 | 8/1994 | United Kingdom . |
| 9610887 | 4/1996 | WIPO . |

*Primary Examiner*—Bipin Shalwala
*Assistant Examiner*—David L. Lewis
*Attorney, Agent, or Firm*—Mark A. Aaker; Blakely, Sokoloff, Taylor & Zafman

[57] ABSTRACT

A method of and apparatus for convolution that provides both scaling and elimination of flicker when displaying computer generated or computer processed information on an interlaced, television monitor. One preferred embodiment includes a bilinear interpolation for scaling combined with a modified three line convolution for flicker reduction. In one preferred embodiment, 8 lines of a source computer image are scaled to 7 lines of a television image for display. The weighted contribution of each input line varies according to which combination of lines contribute to each output line, and the mathematically optimal weighting factors are modified for easier implementation in hardware.

5 Claims, 6 Drawing Sheets

PRIOR ART

FIGURE 4

PRIOR ART

METHOD AND APPARATUS FOR VIDEO SCALING AND CONVOLUTION FOR DISPLAYING COMPUTER GRAPHICS ON A CONVENTIONAL TELEVISION MONITOR

CROSS-REFERENCES TO RELATED APPLICATIONS

This application is a continuation of copending application Ser. No. 08/543,102, filed Oct. 13, 1995.

FIELD OF THE INVENTION

The present invention is directed to the field of displaying high resolution, computer-generated images on a conventional television monitor. In particular, the invention is directed to interpolating information from a non-interlaced frame buffer to provide video information suitable for display on an interlaced monitor.

BACKGROUND OF THE INVENTION

Many modern video display devices fall into one of two categories—computer monitor or television monitor. Television monitors are designed for use with broadcast or recorded television signals. The transmission standards for broadcast television signals have been set for decades and include NTSC in the United States and Japan, PAL in much of Europe, and SECAM in France. Analog video tape recording equipment is usually designed to follow one of these standards as well and is sold in each country to conform to the local standard. Other television equipment, such as cameras or camcorders, can be found for use with each of these standards. These transmission standards are well known in the industry and to one skilled in the art. Although each standard differs from the others in terms of number of lines displayed, operating frequencies, and other details, each of these standards shares certain characteristics. For purposes of discussion, the following disclosure will refer to certain specific frequencies and other characteristics of a television standard in terms of NTSC standard values. One skilled in the art will recognize that corresponding values pertain to other television standards and can apply the principles disclosed here to understand the teachings of this invention. Also, transfer of a video signal to a television monitor will be discussed as a transmission, but this transmission might be broadcast or might be transferred through a wired connection.

Figure 1A:
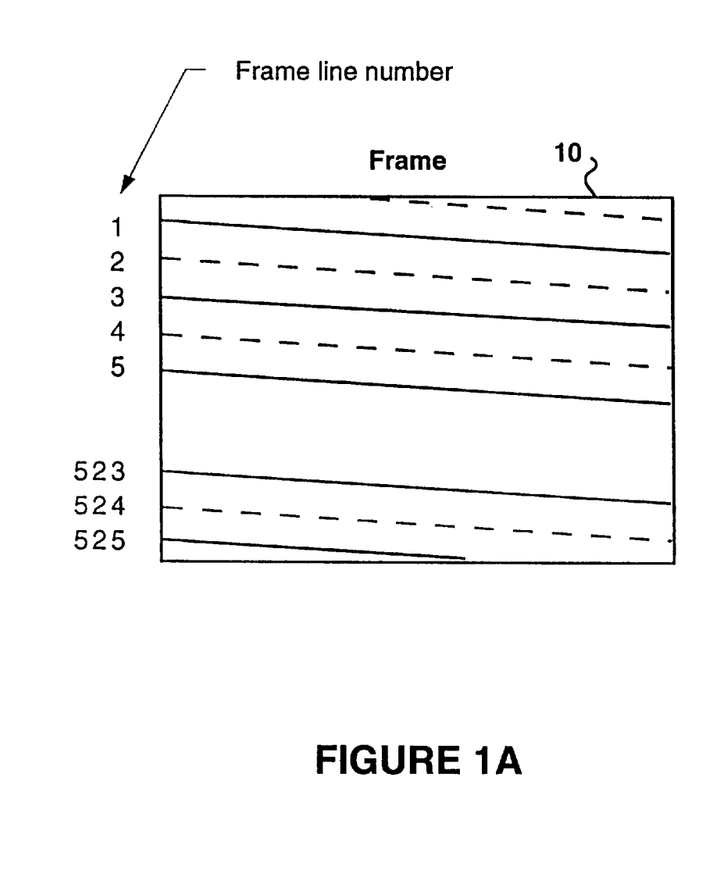
FIGS. 1A and 1B illustrate a frame and fields in an interlaced video display.
Figure 1B:
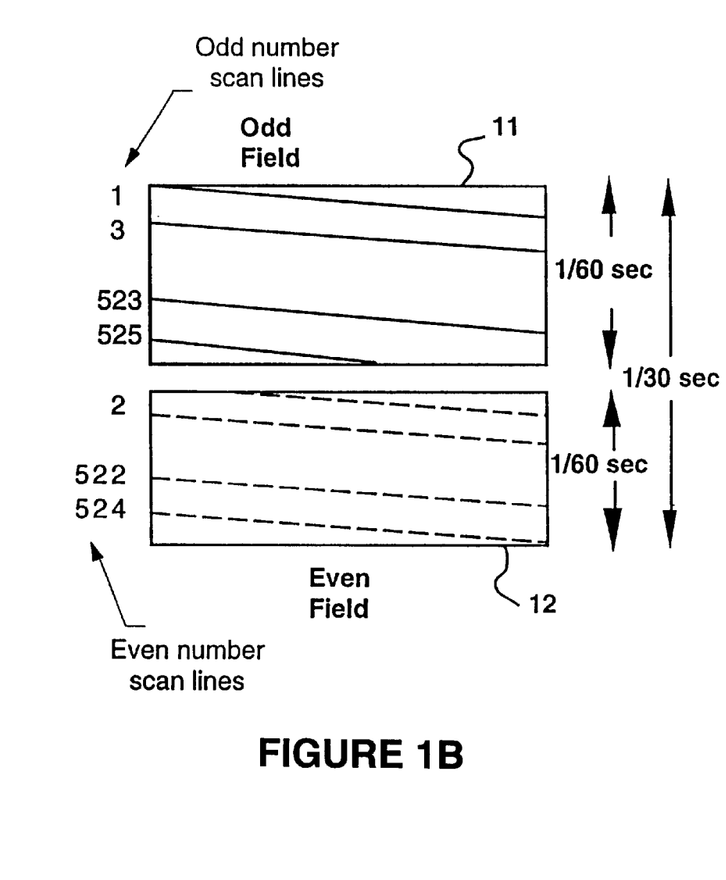

A single frame of a television video image comprises two fields, each field including a series of scan lines. Referring to FIGS. 1A and 1B, frame 10 includes sequential scan lines 1, 2, 3, 4, . . . 524, 525. The specific number of scan lines, here 525, depends on the specific television standard, here the NTSC standard. Frame 10 is comprised of two fields, odd field 11 and even field 12. Odd field 11 is written to a TV screen as a series of scan lines, odd lines 1, 3, 5, . . . , then even field 12 is written to the TV screen as a series of even scan lines 2, 4, 6, . . . interlaced between the odd scan lines. According to the NTSC standard, each field is written in ⅟₆₀th of a second for a total time of ⅟₃₀th of a second to display each frame 10. The NTSC standard also specifies how long each scan line may be and some of the electrical characteristics of the signal and of the display. In a conventional television, the signal along each scan line is continuously changing. A television video signal may be recorded on magnetic tape as an analog signal including information about each scan line of each field.

The advent of the digital computer brought about widespread use of computer monitors. Early computers, especially for home use, relied exclusively on television monitors for output, but as computers became more powerful, it became possible to use a much higher-quality display device—a computer monitor. A computer monitor, while in some ways very like a conventional television monitor, has control electronics that are generally much more precise than those found in a conventional television monitor. The computer monitor can position the electron beam much more precisely and so allows for continuous, sequential scanning of the entire frame, line by line, without interlacing. Each line consists of a number of discrete pixels (picture elements). A video image is stored in a computer as a series of digital bytes. Depending on the capabilities of a particular computer or display, this may include only a single bit of information for each pixel (allowing for two colors, typically black or white) or for more powerful systems many bits of information for each pixel. A typical high quality monitor can display 32 bits of information for each pixel.

A number of array patterns for computer displays have become standard in the industry. One particularly common size is 640×480 pixels (the VGA standard is this size, and many Macintosh and other computers support VGA and non-VGA monitors with this display resolution). Other common sizes include 320×240 (these days generally considered only for low resolution or small image sizes, e.g. one quarter of a 640×480 image), 832×624, 1024×768 and many others. For convenience, the following discussion will refer to 640×480 in certain examples but the principles and teachings of this invention pertain to other resolutions as well.

The increasing use of computers has led to the desire to use a standard television to display a computer-generated or -processed image. This is particularly true for a variety of computer game players, which can be connected to a user's television at home or elsewhere. New computers are becoming smaller and more powerful and can be used for games as well as for information processing such as multimedia CDs and communication over the Internet. One example of such a computer is the Pippin, designed and currently being developed by Apple Computer, Inc., of Cupertino, Calif. Certain details of the Pippin architecture are described below by way of example to illustrate the teachings of this invention.

A television monitor suffers from several disadvantages when used to display computer images. Two very significant problems are overscan and flicker.

A typical television transmission is designed to overscan the available display space, so some information is expected to be lost along at least some edges. Where a computer menu or other information is displayed along an edge, typically the top but sometimes the bottom or a left or right edge, loss of even a small portion of the information can make it difficult or impossible to use the computer.

A typical NTSC signal includes 525 scan lines for each frame, although only about 480 of these are shown in a typical display. Some of the remaining lines are part of the vertical blanking interval, which is provided to allow time for the scanning electronics to reset from the extreme low corner of the screen to the opposite, high corner and to allow time to synchronize certain special portions of the television transmission signal. Most of the remaining lines, however, are not displayed because of deliberate overscan.

Figure 2:
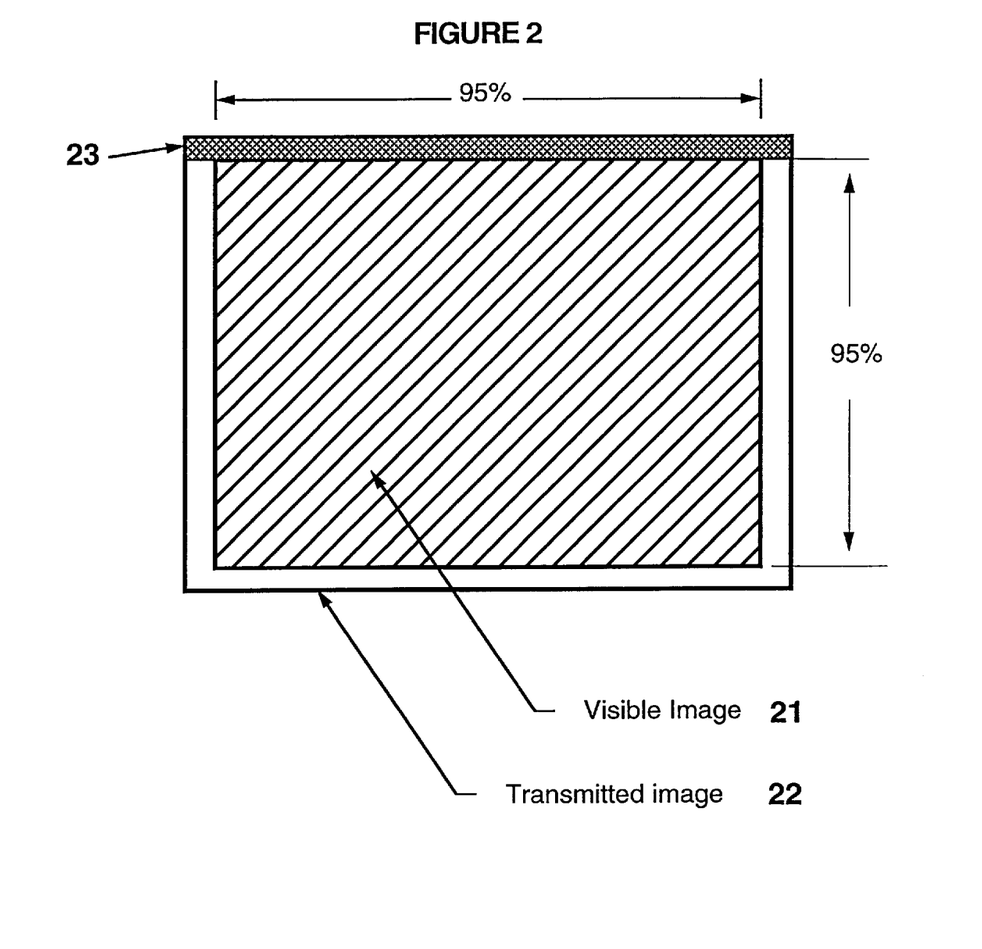
FIG. 2 illustrates overscan in a television transmission.

There are good reasons why a conventional television transmission is designed with overscan. Televisions vary in many ways, including physical scan capabilities, accuracy, curvature, mask or bezel position, manufacturing and component tolerances and component aging. To compensate for this variation, a typical television transmission includes more vertical scan lines of information than can be displayed on a typical television. In addition, a typical transmission includes longer scan lines than can be displayed. Referring to FIG. 2, the resulting visible image 21 displayed is approximately 90% of the transmitted image 22. The result is that for almost all televisions, some information on each edge is thrown away (not displayed) but for almost no televisions is there a blank portion along any edge. However, if a top portion 23 of transmitted image 22 is in the overscan region, it may not be displayed at all.

Flicker can be a significant problem as well. In general, images updated less than 40 times a second on a display have noticeable flicker. Studies have shown that flicker is not noticed by most people if the images are updated faster than 60 times a second (refresh rate of 60-Hz). In interlaced scanning, first all odd lines are scanned from top to bottom, the even lines are skipped. After the vertical retrace, all the even lines skipped in the first scan are scanned from top to bottom. Under NTSC standards, the vertical refresh rate of each field is 60-Hz, resulting in a frame refresh rate of 30-Hz. It is important to note that each scan line is updated at refresh rate of 30-Hz. Under PAL and SECAM standards, the corresponding values are even slower: 50-Hz and 25-Hz.

In addition, images with high vertical contrast tend to flicker noticeably when displayed on interlaced television. An example of this would be a narrow horizontal line, often found in a table of numbers. If the line to be displayed happens to fall just along one scan line on the television, then it will flash on only once every 30th of a second. If that same line was just a bit wider and so fell along an odd scan line and an adjacent even scan line, each line would be displayed alternately so the resulting line would be displayed every 60th of a second (but moving up and down slightly).

Most natural images (scenery, people etc.) do not have a sharp vertical contrast i.e. there is not much difference in intensity between adjacent horizontal lines. This results in an apparent refresh rate of 60-Hz for the TV thereby causing minimal flicker. However, computer generated graphics can have a large intensity vertical contrast (ex. a single pixel black horizontal line on a white background). Since each line is updated at a refresh rate of 30-Hz, the line would flicker noticeably.

Overall, these disadvantages generally are not significant in traditional broadcast television. In a traditional television image, a typical source is some natural scene as captured by a camera. With regard to overscan, if some of the edges are not seen, this is simply perceived as a field-of-view issue, comparable to zooming in or out slightly. With regard to flicker, an object of high vertical contrast, such as a table top, is rarely only one scan line wide. Certain natural objects do contain very fine lines, sometimes found on clothing or perhaps in a fence. Television newscasters avoid clothing with plaids or narrow horizontal stripes because the resulting transmission can result in a striking flicker effect.

Several techniques are used today to address this overscan problem when displaying computer images, but none of these techniques solve all of the problems. Convolution has been used in the past to change the size of an image. Convolution has also been used to convert between interlaced and non-interlaced images. Various convolution schemes used historically are not useful in this instance because they are either too expensive or not sufficiently powerful. Existing solutions include:

1) Recreate content: One simple approach is to recreate content or images that are less than the relevant computer image size, for example 640×480 pixels. This however, requires considerable work and many, if not all, computer programs would have to be rewritten. For computer titles that may be used on either a computer or television display, this would require different versions of the program, which inevitably causes problems including sales and inventory management difficulties and consumers being forced to choose one or the other when they might want both.

2) Image reduction by pixel/line dropping: This simple technique drops one out of 'n' pixels and/or one out of 'n' lines to scale an image. For example, to scale the image by $2/3$ just drop 1 out of 3 pixels. Unfortunately, this simplistic algorithm does not yield high quality images. A one-pixel-wide horizontal or vertical line in the source image inadvertently may be omitted entirely in the output image if this technique is used.

3) Bi-linear interpolation: This technique uses weighted average between the two nearest pixels to create an output pixel. This is a cost effective technique resulting in generally good quality images.

4) Multiple tap finite impulse response (FIR) filters: This technique uses multiple tap (up to 65 tap) filters for horizontal and vertical resizing. This results in very good image quality but needs complicated and expensive hardware.

The problem of flicker has been addressed with some limited success by earlier image display schemes. However, none of these schemes can provide the high quality image that consumers now expect when viewing computer images. Existing solutions include:

1) Display only one field: This technique displays only one field of the frame at 60-Hz (the other field is not scanned and is black). However the resulting image is of much lower resolution as every other line is missing (black).

Figure 3:
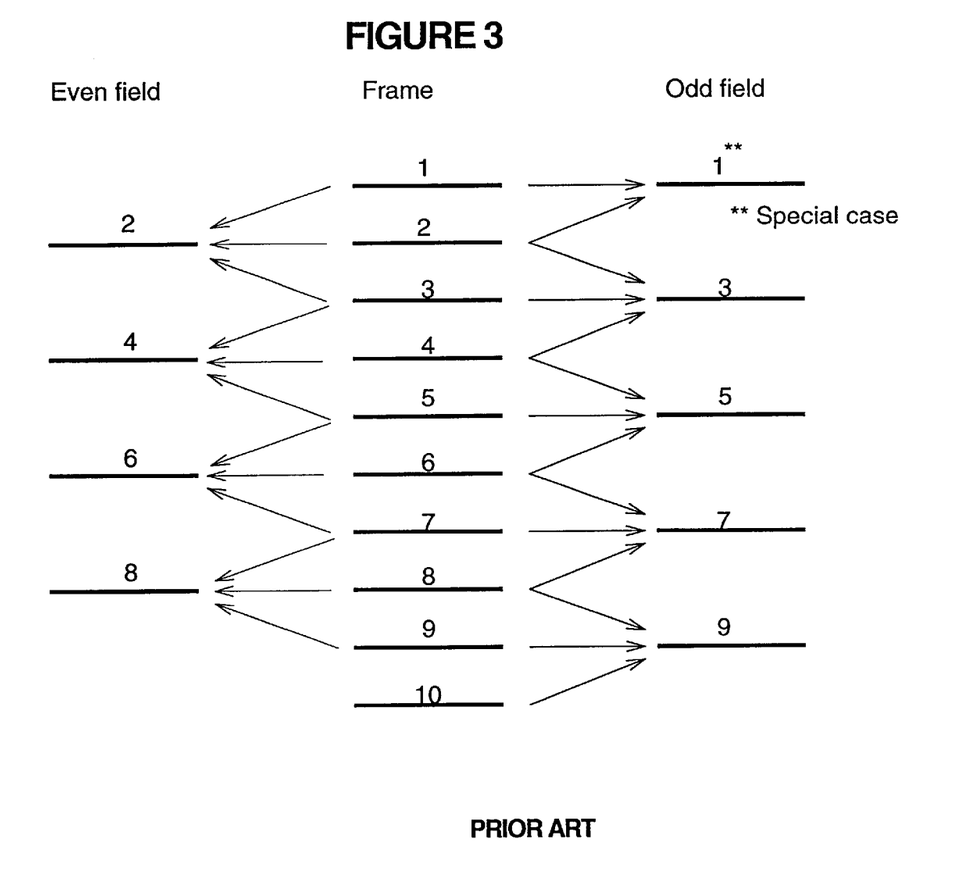
FIG. 3 illustrates a prior art technique for flicker reduction using a 3-line convolution technique.

2) Three line convolution: This technique reduces flicker by reducing the contrast between horizontal lines by averaging three adjacent vertical pixels (see FIG. 3). Typically, for interlaced line 'p' the new pixel intensity 'n' is given by:

$$n=(¼)*(p-1)+(½)*(p)+(¼)*(p+1) \qquad \text{Eqn. 1}$$

where (p−1) is the line above and (p+1) is the line below the line being convolved. This technique is quite effective and reduces flicker to an acceptable level. Note that calculation of the first odd-field scan line is a special case combining only two lines.

Figure 4:
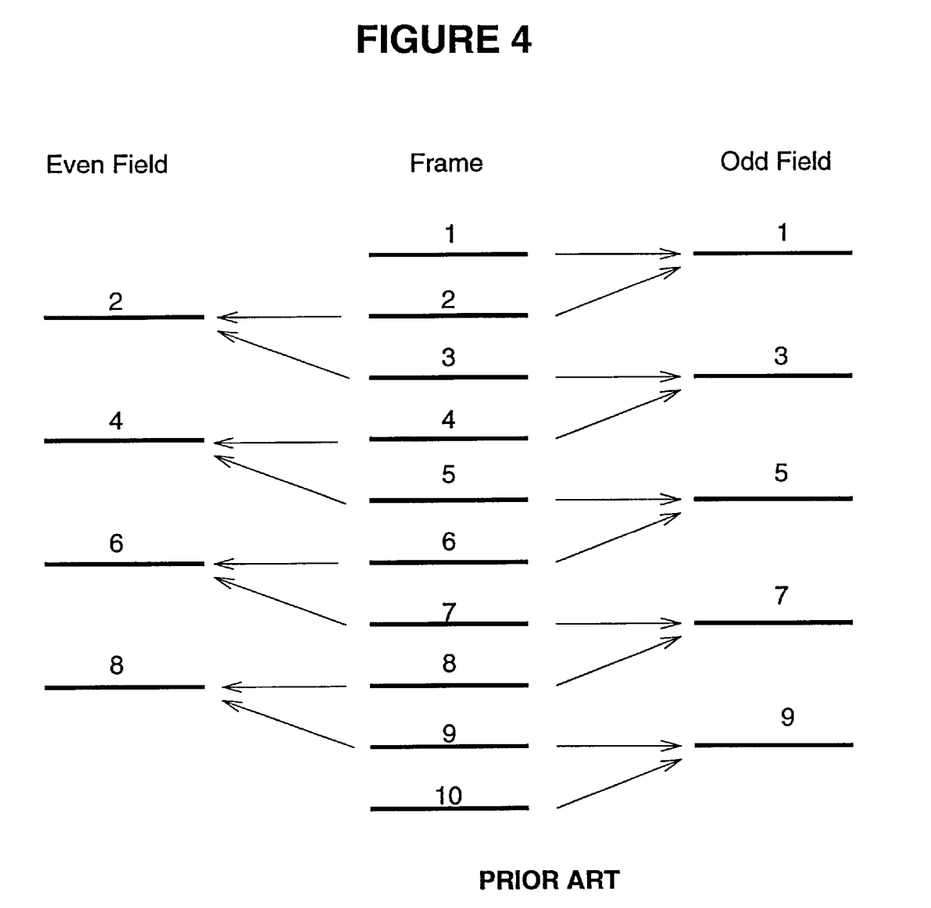
FIG. 4 illustrates a prior art technique for flicker reduction using a 2-line convolution technique.

3) Two line convolution: This techniques reduces flicker by reducing the contrast between two horizontal lines by averaging two adjacent vertical pixels (see FIG. 4). Typically, for interlaced line 'p' the new pixel intensity 'n' is given by:

$$n=(½)*p+(½)*(p+1) \qquad \text{Eqn. 2}$$

This technique is not as effective as the three line convolution.

SUMMARY OF THE INVENTION

The present invention is an improved method of and apparatus for convolution that provides both scaling and elimination of flicker when displaying computer generated or computer processed information on an interlaced, television monitor. One preferred embodiment includes a bilinear interpolation for scaling combined with a modified three line convolution for flicker reduction.

In one preferred embodiment, 8 lines of a source computer image are scaled to 7 lines of a television image for display. The weighted contribution of each input line varies according to which combination of lines contribute to each output line, and the mathematically optimal weighting factors are modified for easier implementation in hardware.

It is therefore an object of this invention to provide a method and apparatus for scaling and convolving one video image to a second video image to minimize overscan and flicker.

Another object of this invention to provide a method and apparatus for displaying a computer video image on a television monitor with clarity.

This and other objects and advantages of the invention, as well as the details of an illustrative embodiment, will be more fully understood from the following specification and drawings.

DESCRIPTION OF THE PREFERRED EMBODIMENTS

The invention describes an algorithm that implements both image reduction and flicker reduction in a single pass. Certain trade-offs are included that make the implementation of the algorithm extremely efficient in hardware.

Image reduction: To compensate for overscan the image is scaled by $7/8$ using bilinear interpolation. This is a 12.5% image reduction. Bilinear interpolation uses weighted average between the two nearest pixels to create the output pixel. Seven pixels are created from eight as shown below:

| p1 | p2 | p3 | p4 | p5 | p6 | p7 | p8 |
|----|----|----|----|----|----|----|----|
| n1 | n2 | n3 | n4 | n5 | n6 | n7 |    |

Pixels in the original image are represented by p1, p2, ..., p8, while pixels in the scaled image are represented by n1, n2, ..., n7.

$$n1 = (7/8)p1 + (1/8)p2 \quad \text{Eqn 3}$$

$$n2 = (6/8)p2 + (2/8)p3 \quad \text{Eqn 4}$$

$$n3 = (5/8)p3 + (3/8)p4 \quad \text{Eqn 5}$$

$$n4 = (4/8)p4 + (4/8)p5$$

$$n5 = (3/8)p5 + (5/8)p6$$

$$n6 = (2/8)p6 + (6/8)p7$$

$$n7 = (1/8)p7 + (7/8)p8$$

Scaling is performed both horizontally and vertically. In one preferred embodiment, horizontal scaling may be performed using a horizontal bilinear interpolation unit. Vertical scaling, however, can be performed in conjunction with convolution as described below.

Flicker reduction: To reduce flicker in the image a two line convolution is performed on the vertically scaled pixels. A two line convolution is given by:

$$\text{line } 1 = (½)\{n1\} + (½)\{n2\} \quad \text{Eqn. 6}$$

Substituting values of n1 and n2 from Eqn. 3 and Eqn. 4 gives:

line 1=(½) {(⅞)p1+(⅛)p2}+(½){(⅝)p2+(⅜)p3} line 1=(7/16)p1+(7/16)p2+(2/16)p3 or line 1=(7(p1)+7(p2)+2(p3))/16

This results in a convolution that is close to a three line convolution which has been demonstrated to be an effective technique for flicker reduction.

Similarly the scaled and flicker-reduced output lines 1, 2, . . . , 7 are given by:

$$\text{line } 1 = 7(p1) + 7(p2) + 2(p3) \quad \text{/*divide each coefficient by 16*/}$$

$$\text{line } 2 = 6(p2) + 7(p3) + 3(p4)$$

$$\text{line } 3 = 5(p3) + 7(p4) + 4(p5)$$

$$\text{line } 4 = 4(p4) + 7(p5) + 5(p6)$$

$$\text{line } 5 = 3(p5) + 7(p6) + 6(p7)$$

$$\text{line } 6 = 2(p6) + 7(p7) + 7(p8)$$

$$\text{line } 7 = 1(p7) + 7(p8) + 7(n+1) + 1(n+2)$$

where (n+1) means line 1 and (n+2) means line 2 of the next set of 8 lines.

A number of useful simplifications are implemented in the algorithm by the following steps:

1) For computational simplicity, round the 7/16 in the middle column into an 8/16 coefficient and decrease the larger side band (first or third column) by 1/16 (to maintain unity gain). Increasing the 7/16 coefficient to 8/16 results in a divide-by-two of the pixel value, which can be implemented as a right-shift, a trivial operation in hardware.

2) It is helpful to limit the minimum contribution of any line to 3/16th. This increases the flicker reduction capabilities of the algorithm by ensuring that adjacent lines always contribute a reasonable amount to the flicker reduced line. For example, in line 1, the (p3) coefficient is 2/16, which is less than 3/16. Increasing the (p3) coefficient to 3 requires reducing the (p1) coefficient to 5. The treatment of line 6 is similar.

3) For line 7, drop the 1(p7)(/16) term because:

i) its contribution is small, only 1/16, and, ii) this provides symmetry in the algorithm (each convolved and scaled line always has only three terms).

Looking more closely at the modification of coefficients for line 7, dropping the 1(p7)(/16) term leaves three terms. The middle term is now the 7(n+1)(/16) term. Rounding according to step one above and decreasing the larger sideband (p8) from 7 to 6/16 leaves the other sideband at 1/16. However, this is less than 3/16. Applying step 2 above, the (n+2) coefficient is set to 3/16 which requires reducing the (p8) coefficient to 5/16.

The revised table is:

$L1 = 5(p1) + 8(p2) + 3(p3)$   /*divide each coefficient by 16*/

$L2 = 5(p2) + 8(p3) + 3(p4)$ $L3 = 4(p3) + 8(p4) + 4(p5)$ $L4 = 4(p4) + 8(p5) + 4(p6)$ $L5 = 3(p5) + 8(p6) + 5(p7)$ $L6 = 3(p6) + 8(p7) + 5(p8)$ $L7 = 5(p8) + 8(n+1) + 3(n+2)$ $L8$ is like $L1$, etc.

Figure 5:
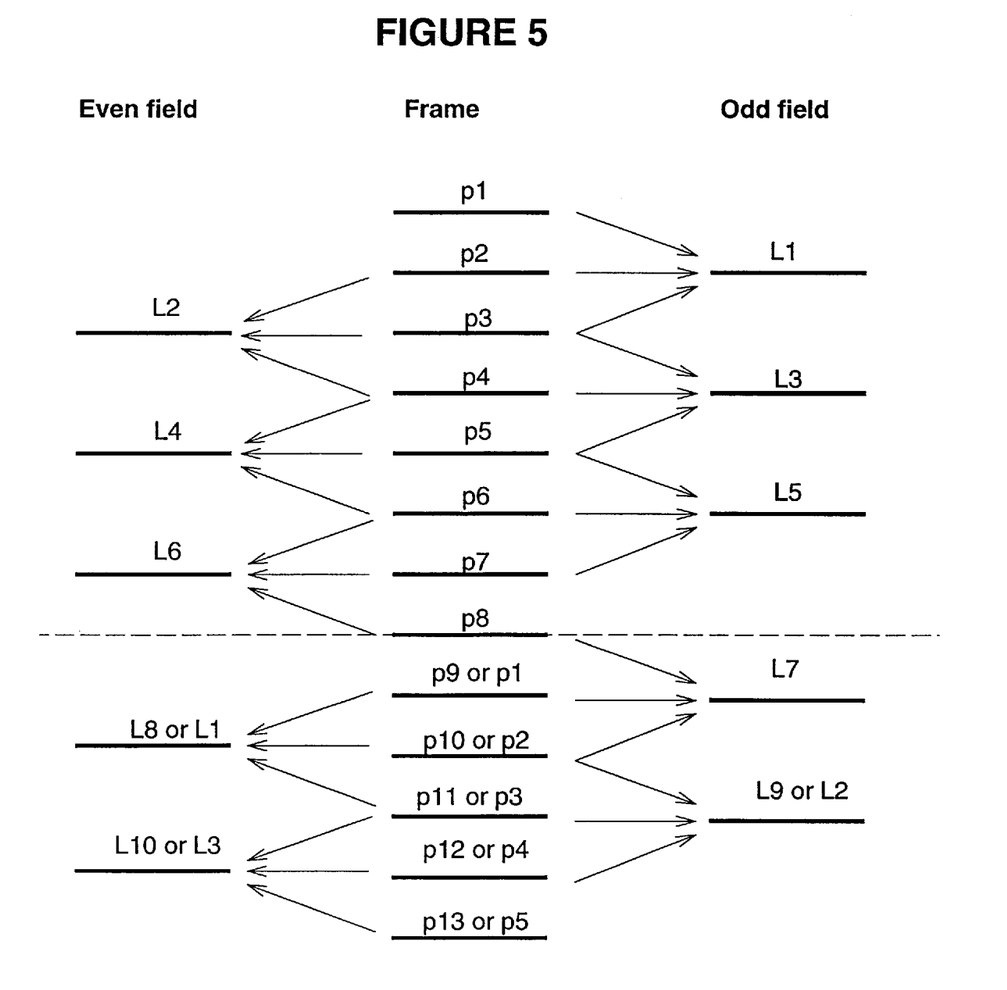
FIG. 5 illustrates the new technique for resizing and flicker reduction.

The order in which the convolution is performed and scaled lines appear in the even and odd field of an interlaced monitor are shown in FIG. 5 and are listed below:

| Even Field | Odd Field |
| --- | --- |
| L2 | L1 |
| L4 | L3 |
| L6 | L5 |
| L1 | L7 |
| L3 | L2 |
| L5 | L4 |
| L7 | L6 |
| L2 | L1 |
| (i.e.. repeat) | (i.e.. repeat) |

Thus the even field is processed first using inputs and coefficients for L2, then the next line uses inputs and coefficients for L4, then L6, L1, etc. until the entire even field has been displayed. The odd field is then processed in the same way, beginning with inputs and coefficients for L1.

In a more general solution, coefficients which approximate a binary integer (an integer power of 2) can be rounded to the binary integer. For implementation in hardware, a corresponding right shift is easily selected (e.g. two shifts for a divide-by-four). When adjusting any coefficients, corresponding, off-setting adjustments are required so the total contribution to a single line is normalized.

If any convolutions require any extra terms (here a fourth term only in line 7), see if there is a term which makes a minimal contribution and therefore can be ignored. For coefficients which are minor contributors, select a minimum value below which the contribution can be approximated as zero. In this instance, $\frac{1}{16}$ is selected as a round-to-zero threshold for the extra term, but in another implementation with a different scaling factor or different number of lines being convolved, a different round-to-zero threshold may be appropriate. In general, a contribution of less than about 10% (in a three line convolution) may be rounded to zero.

Finally, coefficients which are smaller than some minimal contribution threshold may be rounded to that minimal contribution threshold. In the particular example presented here, that minimal contribution threshold was selected as $\frac{3}{16}$ but one skilled in the art may apply the teachings of this invention to select an appropriate threshold for other situations. In experiments and simulations, balancing a number of factors including psychovisual effects as perceived by a variety of observers, a contribution of approximately 25% was determined to be significant. Balancing a number of factors, $\frac{3}{16}$ was selected as the minimal contribution threshold.

Figure 6:
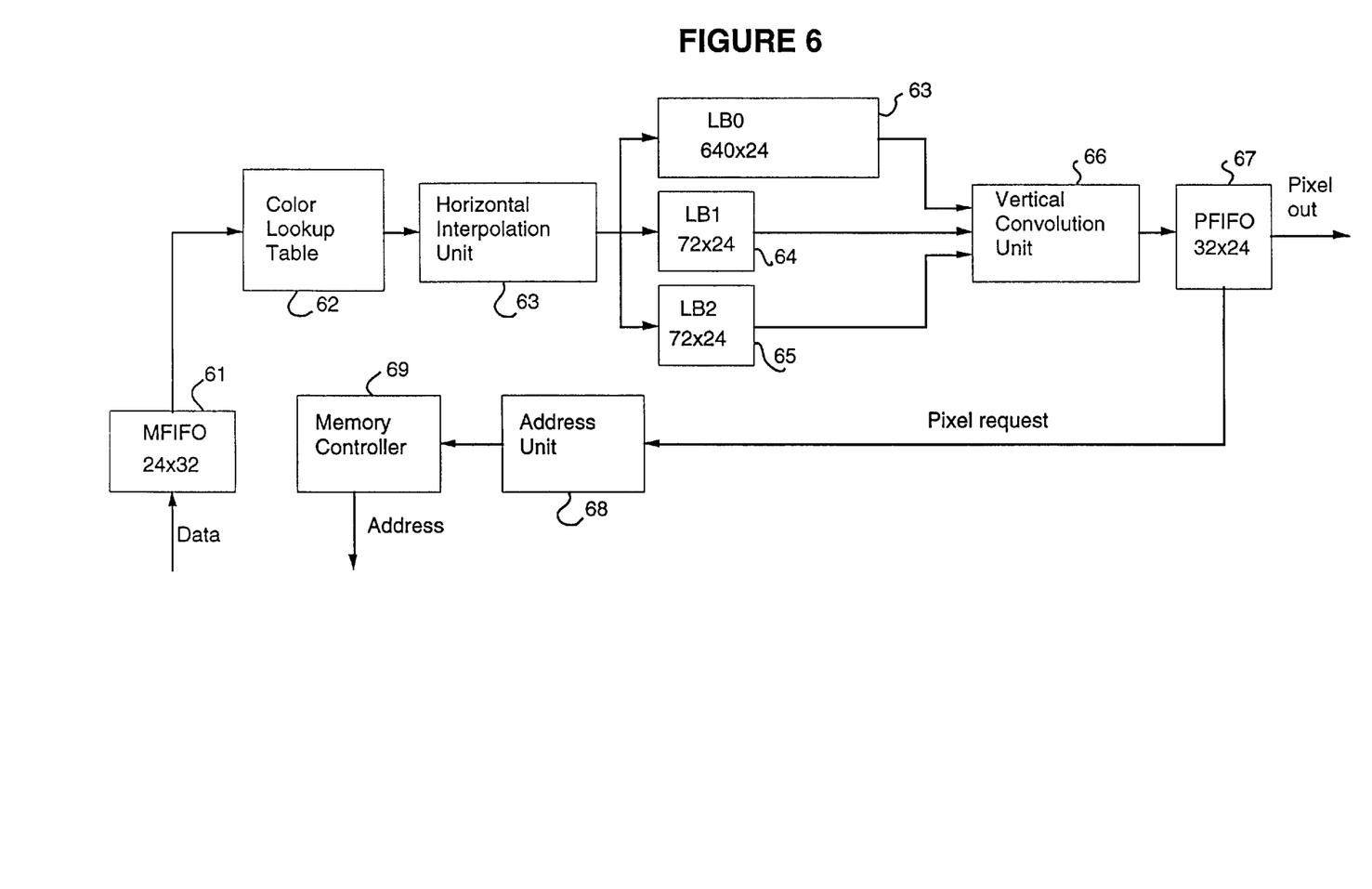
FIG. 6 illustrates a block diagram of a device suitable for practicing the present invention.

Referring to FIG. 6, in one preferred implementation of a device to practice the new method, the major units are connected as shown. Other connections exist but are not shown that allow each line buffer or FIFO to send requests to address unit 68 to request data as needed by the requester. When the unit is originally powered up, all of the memory components are empty and thus begin requesting data.

Incoming computer video data passes through memory FIFO (MFIFO) 61. Each pixel from MFIFO 61 is read and expanded, as needed, in color look up table 62, and passed to horizontal interpolator unit 63 which performs the bi-linear interpolation on each sequence of adjacent pixels to scale the adjacent pixels along each line, here by ⅞ as described above. Thus eight pixels of input are interpolated to seven pixels of output. This interpolation is implemented by procedures typically used in the prior art, with fixed coefficients as described above in Eqn. 3, Eqn. 4 etc. Note that the color look up table is not an essential element of this invention but is present in the circuit for the usual reasons, well known to one skilled in the art.

The resulting output is passed selectively to line buffer 0 (LB0) 63, line buffer 1 (LB1) 64, or line buffer 2 (LB2) 65. The pixels in the three line buffers 63, 64, and 65 are selected as needed by vertical convolution unit 66 which applies the appropriate weighting to each pixel and combines them in accordance with the description elsewhere in this disclosure. In one preferred embodiment the weighting coefficients are hard coded in a look up table accessible to (or internal to) the vertical convolution unit, but one skilled in the art will appreciate many ways to store or provide weighting coefficients as needed. The final result is buffered in pixel FIFO (PFIFO) 67 as needed then directed to the output as needed. If additional pixels are needed, PFIFO 67 can signal a pixel request to address unit 68 which passes instructions to memory controller 69 to access the desired data which is then delivered to MFIFO 61, and processed as described above.

In a preferred embodiment, the pixel FIFO is provided to accommodate the different speeds of video processing on the computer side (here 66 MHz) and on the television transmission side (12.27 MHz for NTSC, 14.75 for PAL, etc.). The size of pixel FIFO 67 was selected to be able to service display requirements and allow for any computer processing between video output convolution. Similary, the size of memory FIFO 61 was selected to hold sufficient data as transferred from the video frame buffer (not shown) for processing and delivery to the television transmission output.

A line is shown for a pixel request from pixel FIFO 67 to address unit 68. Such a request is coordinated with requests from vertical convolution unit 66, and each of line buffers LB0 63, LB1 64 and LB2 65, and MFIFO 61. Buffer management components (not shown) monitor when each line buffer needs additional pixels input. In a preferred implementation, elements of the device that need to be coordinated keep track of which pixel in which line is being processed. If a gap of eight pixels opens up, a request is made for eight more pixels.

The selection of 72×24 as a depth for LB1 and LB2 was selected as sufficient to feed vertical convolution unit 66 yet allow time for the central processor (not shown) to service non-video functions. LB0 63 is a full 640 pixels long. This allows an entire line of pixels to be stored. This is advantageous in that when processing sequential lines, there is always at least one line in common (although typically weighted differently). For example, the inputs for a L2 are p2, p3 and p4. The line to be processed after L2 is L4, with inputs p4, p5 and p6. When processing an output line, an input line common to that output line and the next-to-be-processed output line is selected and loaded into LB0 63. This line then needs to be loaded only once and can be used for two output lines. That line buffer can be loaded with a different common input line for the next pair of output lines. This sequence results in a significant savings in bandwidth. Line buffers LB1 and LB2 are filled as needed to provide the inputs needed for processing any particular output line.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. An image processor for converting a computer image to an output image displayable on a television monitor, comprising:

an interpolator unit configured to horizontally scale a first number of pixels to a second number of pixels less than the first number of pixels; and an convolution unit configured to provide flicker reduction in the image by simultaneously using bilinear interpolation, and two-line convolution to scale and convolve the second number of pixels into output pixels for the output image, wherein each output pixel has a contribution from at least three of the second number of pixels.

2. A method of converting a computer image to an output image displayable on a television monitor comprising:

interpolating to horizontally scale input pixels of the computer image, and simultaneously using bilinear interpolation and two-line convolution to vertically scale and convolve the horizontally scaled inputs pixels into the output image, wherein each pixel in the output image has a contribution from at least three of the horizontally scaled input pixels.

3. The method of claim 2, further comprising the step of displaying a first plurality of the output pixels interlaced with a second plurality of the output pixels.

4. The method of claim 2, wherein the step of simultaneously using bilinear interpolation and two-line convolution comprises the steps of:

increasing the contribution of one of the horizontally scaled input pixels; and decreasing the contribution of another one of the horizontally scaled input pixels.

5. The method of claim 2, wherein the step of simultaneously using bilinear interpolation and two-line convolution comprises:

omitting the contribution of one of the horizontally scaled input pixels when the contribution of the horizontally scaled input pixel to a pixel in the output image is less than a predetermined minimum contribution.

* * * * *